Patented Jan. 5, 1954

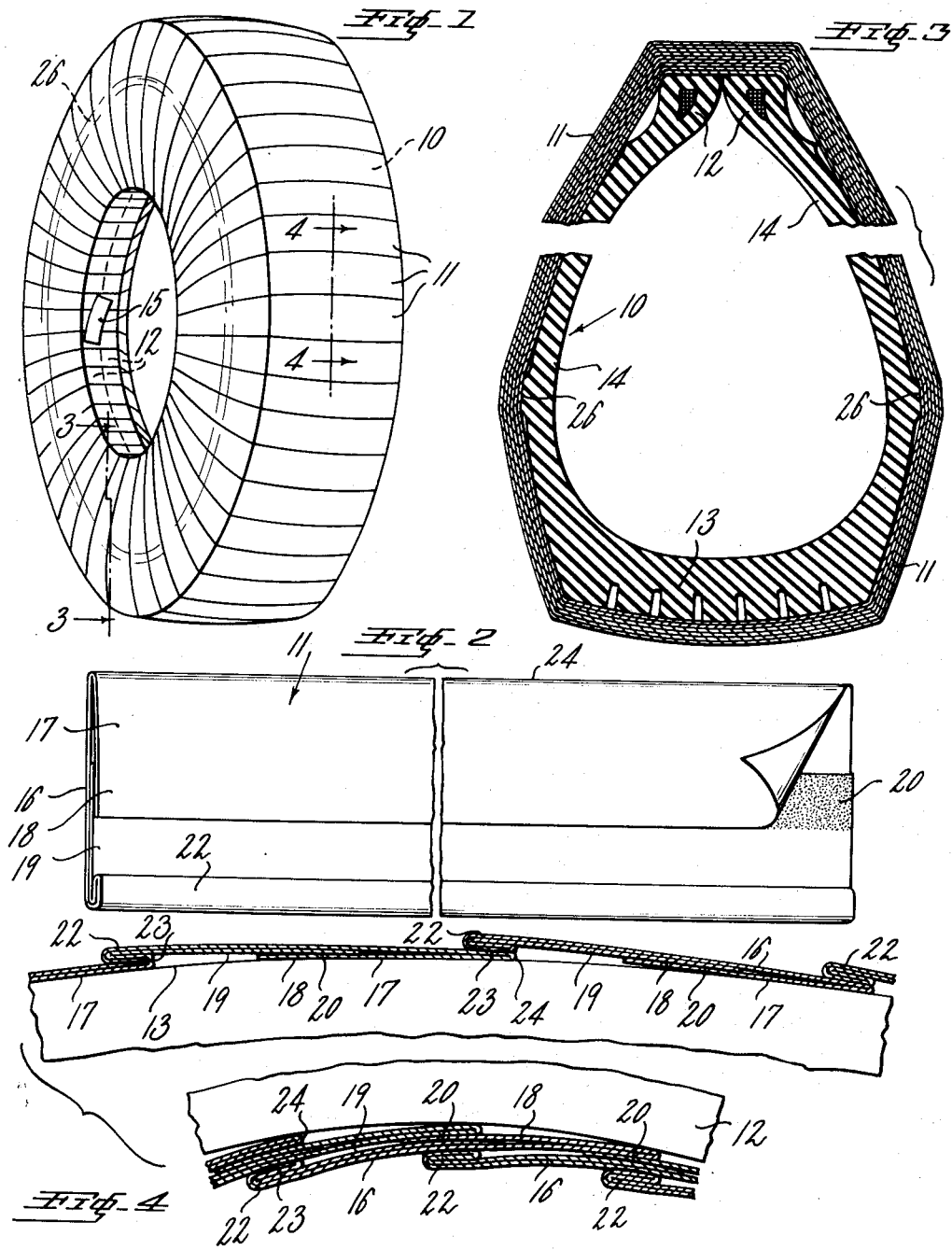

2,665,001

UNITED STATES PATENT OFFICE 2,665,001

WRAPPED TIRE

Harold D. Corney, Dumont, N. J., assignor to United States Rubber Company, New York, N. Y., a corporation of New Jersey Application May 2, 1950, Serial No. 159,590

1 Claim. (Cl. 206—46)

This invention relates to a wrapped tire and more particularly it relates to a pneumatic tire casing spirally wrapped with a protective paper covering taking essentially the form of a flattened tube.

It is a common practice in the art to envelop pneumatic tire casings in a covering of wrapping material prior to shipment of the tire casings from the factory. This is done to protect the tire during shipment and storage. Thus, the wrapping protects the tire from being soiled by dust and dirt, or from being scuffed by sliding contact with rough floors and the like, to the detriment of the appearance and saleability of the tire. Such protection is particularly necessary in the case of white sidewall tires which are extremely easily soiled, and in which a perfectly clean appearance is of paramount importance. Another important function of such wrapping is to protect the casing from the deteriorating influence of exposure to actinic light, which is capable of occasioning cracking or checking of the rubber surface, thereby not only spoiling the appearance of the tire but actually decreasing its useful life.

A preferred form of protective wrapping is the so-called "wrap-around" type in which a ribbon or tape of the wrapping material, ordinarily paper, is wound in spiral fashion around the annual torus constituting the tire casing, the edges of adjacent turns of the spiral overlapping somewhat to insure complete enclosure. Such spiral wrapping is preferably applied under sufficient tension to bring the two rims of the tire casing close together, or into actual contact with each other, so that the volume of the tire is reduced, forming a tight compact package which requires substantially less shipping space and storage space than an unwrapped tire. This saving of space represents a substantial economy.

It is difficult to provide a wrapping of the foregoing character which is economical and which at the same time is sufficiently strong to withstand the mechanical abuse to which the wrapped tire is subjected as it is being moved about. Thus, the wrapped casing may be dropped on its tread surface from a height, as while being unloaded from a truck or freight car, and the resulting shock momentarily deforms the tire so that the rims thereof are suddenly urged away from each other, causing the wrapping to split, usually at the rim area, unless it is made of a sufficiently strong grade of paper. Also, the overlapping edges of successive turns of the ordinary wrapping strip are readily susceptible to failure, especially over the tread area and over the sidewall areas, due to the fact that such edges are subjected to tearing forces, as by scraping against rough walls or floors or against the edges of doorways, or by becoming snagged against nails, splinters, or other projections. Once the wrapping tears in one place it starts to unravel and easily becomes torn further so that in a short time the tire is no longer effectively protected.

For these reasons it is not uncommon to find that an appreciable percentage of the tires in a given shipment have had their wrappings severely damaged in transit, even though the wrapping is made of relatively strong paper. Furthermore, the strong paper used is relatively expensive and therefore the wrapping represents an item adding appreciably to the cost of marketing the tire.

Accordingly, a primary object of the present invention is to provide economically a wrapped tire which affords a greater degree of protection and resistance to mechanical abuse than has heretofore been feasible.

Another object is the provision of a tire wrapping which is economical, both as to the quality and quantity of the wrapping material employed, but which at the same time has adequate strength.

Still a further object is to provide a spiral wrapping composed, in effect, of a plurality of layers, but which can be applied in a single wrapping operation.

These, and other objects and advantages, will be made evident in the following exposition of the invention, when read with reference to the accompanying drawing, wherein:

Fig. 1 is a perspective view of a pneumatic tire casing wrapped in accordance with the present invention;

Fig. 2 is a plan view on a larger scale, of a length of the wrapping material removed from the tire;

Fig. 3 is a fragmentary transverse sectional view of the wrapped tire, on a larger scale, taken along line 3—3 of Fig. 1; and Fig. 4 is a fragmentary transverse sectional view, on a larger scale, taken along line 4—4 of Fig. 1.

Referring to the drawing, there is shown in Figs. 1 and 3 a pneumatic tire casing 10, having the usual annular toroidal form, protected by a "wrap-around" type of covering constituted of a continuous length or strip of specially constructed paper tape or ribbon 11. The strip 11 is wound spirally around the inner periphery, or rims 12, and the outer periphery, or tread 13, of the casing 10, and extends also across the sidewalls 14, to form a complete enclosure. As shown in Fig. 3, the wrapping is preferably applied under sufficient tension to draw the rims or beads 12 of the casing inwardly into contact with each other. The relative inextensibility of the wrapping strip 11 permits it to maintain the beads 12 in such contact, thereby producing a more solid, compact package. The edges of successive turns of the protective strip 11 are overlapped somewhat to insure complete coverage, the overlapping at the inner periphery 12 being greater than that at the outer periphery 13, as indicated in Fig. 4, so that the wrapping forms an essentially smooth covering of neat appearance. An adhesive strip 15 is applied across the terminal end of the wrapping strip to secure it firmly in place. Such wrapping may be applied to the tire mechanically by commercially available machines designed for this purpose.

Referring to Fig. 2, the paper strip 11 comprises a band of smooth flat paper 16 folded over on itself from each of its lateral edges inwardly toward its center, one of such folds 17 overlapping at 18 the opposite fold 19 along the medial zone of the band and the under surfaces of such folds contact the upper surface of the center zone of the band. The folds 17 and 19 are secured together at the overlapping area 18 by means of a layer of adhesive material 20.

As thus far described, the wrapping strip 11 is seen to comprise a structure that is essentially a flattened paper tube. The strip is conveniently manufactured in this form before it is applied to the tire. The tube may be handled by the conventional tire wrapping machines in essentially the same manner that an ordinary flat strip of paper would be handled. In the course of applying this flattened tube to the tire, one lateral edge 22 of the tube is preferably folded over on itself, as indicated in Fig. 2, to form a doubly folded narrow marginal edge four layers thick. A layer of adhesive 23 (Fig. 4) is applied between the overlapping edges of successive turns as the wrapping is wound on the tire. The double folding of the edge 22, and the application of the adhesive 23, are accomplished by the wrapping machine.

The manner in which successive turns of the spiral wrapping overlap each other is best seen in Fig. 4. It will be seen that at the tread 13 of the tire the doubly folded marginal edge 22 of one turn of the strip 11 is superimposed on the singly folded edge 24 of the previous turn, resulting in a thickness of six layers of wrapping material at this point. Referring to Fig. 3, it will be noted that over the sidewall portions 14 of the tire, which usually include a buffing rib 26 or similar lateral projection, the thickness of the wrapping at the overlapping edges of successive turns is also six layers. As the wrapping proceeds along the sidewall towards the beads, the amount of overlap progressively increases, until at the tire beads 12, as indicated in Fig. 4, the doubly folded edge 22 is superimposed on the medial zone 18 of the previous turn, and this medial zone itself is superimposed on the singly folded edge 24 of the next previous turn. This superimposition of the single fold 24, the medial zone 18, and the double fold 22, produces a total thickness of nine layers of wrapping material at this point.

If desired, the singly folded edge 24 may also be folded over on itself to form a doubly folded edge similar to the edge 22, thereby producing a thickness of eight layers at the tread and eleven layers at the bead.

The wrapping strip 11 is preferably made of kraft paper, and tests have shown that paper of 40 to 50 lb. basis weight gives a sufficiently strong wrapping that is unusually resistant to tearing or distortion. In fact, actual use of such wrapping in service has shown that the strength and resistance to tearing of the wrapping is equal or superior to that obtainable with a conventional wrapping band of considerably greater basis weight. The increased strength permits the use of a cheaper grade of paper, such as a short fiber southern grade, whereas formerly the long fiber northern grade paper was considered to be essential for adequate strength. Also, it has been conventional to apply the wrapping in the form of two or more superimposed complete spiral wrappings in order to obtain satisfactory strength, but with the present wrapping, a single application actually gives superior performance compared to a conventional double wrapping. Therefore, by the use of the invention it is possible to obtain a satisfactorily wrapped tire more conveniently and at a lower cost than possible with previously known wrappings.

Because the wrapping band is folded over at its edges in flattened tubular form, the edges are not easily torn or abraded, either while the tire is being wrapped in the tire wrapping machine, or while the wrapped tire is being roughly handled in shipment. It is observed that the singly folded edge 24 has even a higher resistance to the initiation of tears than two superimposed layers of unfolded paper would have. It will also be noted that the exposed edge of successive turns of the wrapping is always the doubly folded edge 22. The resistance of this double fold to tearing is remarkably high, and as a consequence the wrapping of this invention is far less subject to tearing at the exposed edges if the wrapping becomes snagged on splinters or other projections. A particular point at which snagging and tearing of the wrapping occurs is along the outermost projection of the sidewalls, corresponding to the lateral rib 26. With the present wrapping, the thickness at this point is six layers of paper, resulting in exceptional strength.

With conventional tire wrappings, particularly when the wrapping is applied under sufficient tension to draw the beads together as illustrated in Fig. 4, a usual point of failure of the wrapping is along the line of joinder of the two beads. This is because of the fact that when the wrapped tire is dropped on its tread surface from a height, as when unloading the tire from a truck or freight car, the resulting shock causes the tire to tend to deform, so that the beads are urged outwardly away from each other with considerable force, frequently splitting the wrapping at the beads. With the present wrapping, the maximum thickness at the beads, when the wrapping is applied as indicated in Fig. 4, is nine layers. Therefore, a relatively great force is required to break the improved wrapping at this point, and as a result, this manner of failure is seldom encountered, compared to the frequency with which such failure occurs with the conventional wrapping.

The wrapping provided in the form of a flattened tube has a minimum thickness of two layers throughout its cross section, even though applied as a single turn. Even if a break or tear should occur in the areas of the wrapping which are of double thickness, such tear is hindered from progressing through a complete turn of the wrapping by the strong overlapped edges 22 and 24, which provide a thickness of at least six layers, as well as by the medial overlapped portion 18, which is three layers thick.

Because of the way the folded over portions of the wrapping band are overlapped at the medial zone thereof and adhered together, the band is structurally stable and not liable to become distorted or improperly disposed during the course of the wrapping operation, or during subsequent handling. The flattened paper tube structure can be manufactured economically from relatively cheap materials, with a minimum quantity of adhesive, and is easily handled by the conventional tire wrapping machines.

Having thus described my invention what I claim and desire to protect by Letters Patent is:

A pneumatic tire casing in the form of an annular torus having beads, sidewall and tread portions, spirally wrapped with a flat paper strip having its lateral edges folded inwardly toward each other, said edges being overlapped at the medial zone of the strip and secured together with adhesive to form a band having the form of a flattened tube, at least one marginal edge of said tube being doubly folded over to produce four thicknesses of paper at said one edge, said doubly folded one edge overlapping the other edge of the tube with successive turns of the wrapping, such overlapping being greater at the beads than at the tread, said doubly folded one edge overlying the medial zone of a previous turn of the tube at the beads, and said medial zone overlying the said other edge of the next previous turn at the beads to produce a thickness of at least nine layers of paper at said overlying edges and medial zone.

HAROLD D. CORNEY.

References Cited in the file of this patent

UNITED STATES PATENTS

| Number | Name | Date |
|---|---|---|
| 1,255,086 | Dubey | Jan. 29, 1918 |
| 2,086,179 | Angier | July 6, 1937 |
| 2,103,892 | Brown | Dec. 28, 1937 |
| 2,158,747 | Doros | May 16, 1939 |
| 2,203,822 | Hyman | June 11, 1940 |